United States Patent
Baumhauer et al.

(10) Patent No.: US 8,147,191 B2
(45) Date of Patent: Apr. 3, 2012

(54) DAMPING DEVICE FOR TURBOMACHINE STATOR

(75) Inventors: Stephane Jean Joseph Baumhauer, Massy (FR); Jerome Alain Dupeux, Vaux le Penil (FR); Francois Maurice Garcin, Paris (FR); Jean-Pierre Francois Lombard, Pamfou (FR)

(73) Assignee: SNECMA, Paris (FR)

( * ) Notice: Subject to any disclaimer, the term of this patent is extended or adjusted under 35 U.S.C. 154(b) by 887 days.

(21) Appl. No.: 12/144,960

(22) Filed: Jun. 24, 2008

(65) Prior Publication Data
US 2009/0004000 A1 Jan. 1, 2009

(30) Foreign Application Priority Data
Jun. 26, 2007 (FR) ..................... 07 04580

(51) Int. Cl.
*F01D 9/04* (2006.01)
(52) U.S. Cl. .................................. 415/209.3
(58) Field of Classification Search ............... 415/209.3
See application file for complete search history.

(56) References Cited

U.S. PATENT DOCUMENTS

| | | | | |
|---|---|---|---|---|
| 5,494,404 A | * | 2/1996 | Furseth et al. ............. | 415/209.3 |
| 6,102,664 A | | 8/2000 | Nguyen | |
| 7,086,831 B2 | * | 8/2006 | Harper ....................... | 415/209.3 |
| 7,824,152 B2 | * | 11/2010 | Morrison ..................... | 415/135 |

FOREIGN PATENT DOCUMENTS

| | | |
|---|---|---|
| EP | 0 017 306 A1 | 10/1980 |
| EP | 1 074 762 A2 | 2/2001 |
| EP | 1 520 957 A1 | 4/2005 |
| GB | 2 400 415 | 10/2004 |
| WO | WO 99/43955 | 9/1999 |

OTHER PUBLICATIONS

U.S. Appl. No. 12/145,085, filed Jun. 24, 2008, Baumhauer et al.
U.S. Appl. No. 12/144,994, filed Jun. 24, 2008, Baumhauer et al.
U.S. Appl. No. 12/209,537, filed Sep. 12, 2008, Le Hong et al.
U.S. Appl. No. 12/207,009, filed Sep. 9, 2008, Garcin et al.

* cited by examiner

*Primary Examiner* — David S Blum
(74) *Attorney, Agent, or Firm* — Oblon, Spivak, McClelland, Maier & Neustadt, L.L.P.

(57) ABSTRACT

A turbomachine stator forming a stator vane ring or upstream guide vane element including a plurality of vanes placed radially between a first inner ring and a second outer ring is disclosed. The two rings are concentric and the second ring has a cylindrical outer surface portion. The stator is characterized in that, on the outer surface portion, at least one vibration-damping laminate is attached. The laminate includes at least one layer of viscoelastic material in contact with the surface portion and one counterlayer of rigid material.

16 Claims, 2 Drawing Sheets

DAMPING DEVICE FOR TURBOMACHINE STATOR

BACKGROUND OF THE INVENTION

1. Field of the Invention

The present invention relates to the field of turbomachines, in particular that of gas turbine engines such as turbojets or turboprops, and has as its object a vibration-damping device for stator parts.

2. Description of the Related Art

Aviation turbomachines consist of a plurality of movable bladed impellers, that is to say rotating disks on the periphery of which movable blades are attached in a gas flow, interacting with fixed bladed impellers forming stator vanes rings or upstream gas flow guide vane elements depending on whether a compressor or a turbine is involved. The latter may consist of assemblies in the form of ring sectors comprising several vanes each, or of single vanes, for example with variable pitch. These components are particularly sensitive parts because they must satisfy, in terms of dimensioning, imperatives of mechanical resistance to temperature and to the aerodynamic load while providing the seal for the gas stream. All of these aspects mean that these structures are statically loaded and that, because of the service life imperatives, the vibration amplitudes that they sustain must remain small.

Since the design and tuning of a turbomachine involves the coordination of several disciplines, the dimensioning process is iterative. Vibratory dimensioning is carried out in order to prevent the presence of critical modes in the operating range. The assembly is validated at the end of the design cycle by an engine test on which the vibratory amplitudes are measured. High levels sometimes appear induced either by synchronous or asynchronous forced responses; or by instabilities. The stator vanes rings or upstream guide vane elements must then be redesigned which is a particularly long and costly process.

The manufacturing objective is therefore to predict as early as possible, in the dimensioning cycle, the levels of vibratory response of the structures in order to be able to take the required corrective measures as early as possible in the design. Amongst these matters, mechanical damping is an important issue for the designers.

In order to ensure the robustness of these parts against vibratory fatigue, one solution consists in adding to the structure specific devices serving as sources of energy dissipation. For example, a damping means on the compressor movable impeller blades is known through document EP 1 253 290. It comprises a layer of viscoelastic material and a stress layer. Since the profile of the blades is in the gas flow stream, the solution proposed in this document provides for a notch to be hollowed out in the profile of the blades and for the damping means to be housed therein. The surface of the blade profiles in contact with the flow therefore does not present any irregularity and the gas flow is not disrupted. Such an arrangement requires awkward machining because of the thinness of the blade. In addition, there is a risk of introducing an imbalance between the various blades of one and the same impeller leading to an unbalance.

BRIEF SUMMARY OF THE INVENTION

The object of the present invention is to attenuate the dynamic responses of a structure under synchronous or asynchronous stress, whether or not of aerodynamic origin, by the provision of dynamic damping.

The turbomachine stator forming a stator vane ring or upstream guide vane element according to the invention comprising a plurality of vanes placed radially between a first inner ring and a second outer ring, the two rings being concentric, the second ring having a cylindrical outer surface portion, is notable by the fact that on the said outer surface portion at least one vibration-damping laminate is attached, the laminate comprising at least one layer of viscoelastic material in contact with said surface portion and one counterlayer of rigid material.

The originality of the present invention lies in the use of laminates consisting of at least one layer of viscoelastic material with at least one stress layer, said laminates being bonded to the structure so as to dissipate the vibratory energy of the part.

The dissipation of the vibratory energy is obtained by shearing deformation of the viscoelastic material, between the structure that deforms under dynamic stress and the stress layer pulled by inertia. These laminates are bonded or attached to the outside of the stator vanes rings or upstream guide vane elements in sectors, on the outer crown, and directly damp the vibration modes of the parts in question.

The invention makes it possible to increase the structural damping of a metal part and to solve a vibration problem encountered in design; the consequence of this in the end is to reduce the associated development and tuning times and therefore to reduce costs.

It also allows the enlargement of the conventional design fields delimited by satisfying services of resistance to the alternating loads and indirectly weight gains.

The invention is applicable irrespective of the type of dynamic load: crossing with engine harmonics, asynchronous or acoustic excitation, aeroelastic instability or excitation by rotor-stator contact.

According to the various embodiments,

The laminate partially covers said outer surface portion axially or circumferentially.

The stator vane ring respectively upstream guide vane element comprises a plurality of laminates distributed circumferentially over the outer surface portion.

The layers are connected together.

The layers are connected together by bonding.

The counterlayer comprises a mechanical attachment member.

The mechanical attachment member connects the counterlayer to the stator vane ring or upstream guide vane element.

The mechanical attachment member keeps the viscoelastic layer pressing against said outer surface portion.

The laminate consists of a stack of viscoelastic layers and alternating rigid layers.

The characteristics of the viscoelastic material vary from one layer to the other.

The characteristics of the viscoelastic material are the same from one layer to the other.

The characteristics of the rigid material vary from one rigid layer to the other.

The characteristics of the rigid material are the same from one rigid layer to the other.

The invention also relates to a turbomachine comprising at least one such stator vane ring or upstream guide vane element. It may be an upstream guide vane element of a turbine stage or a stator vane ring of a compression stage.

BRIEF DESCRIPTION OF THE SEVERAL VIEWS OF THE DRAWINGS

Other features and advantages will emerge from the following description of various embodiments of the invention with reference to the appended drawings in which.

DETAILED DESCRIPTION OF THE INVENTION

Figure 1:
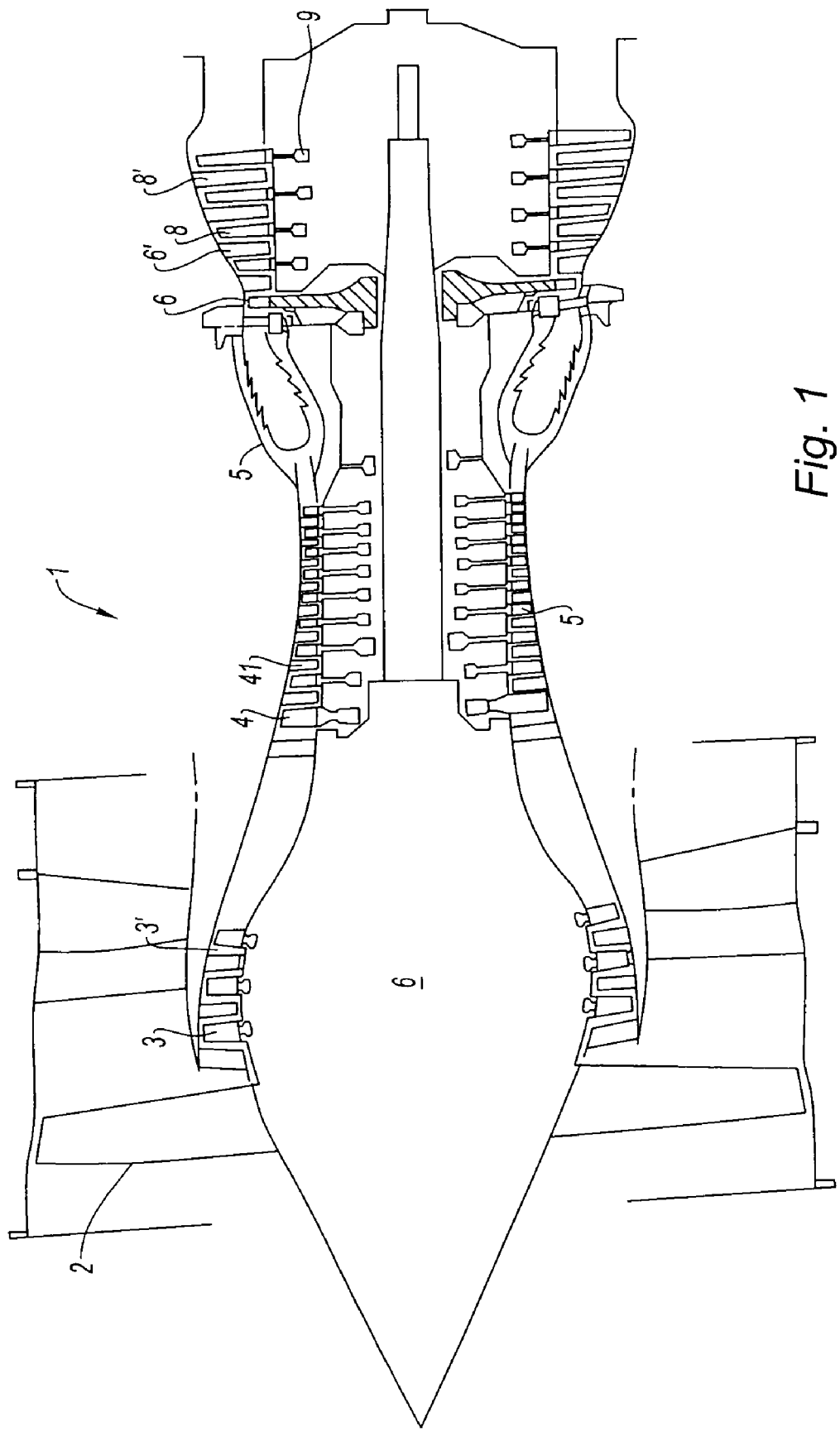
FIG. 1 represents schematically a turbojet in axial section capable of incorporating a stator of the invention.

With reference to FIG. 1, it shows schematically an example of a turbomachine in the form of a turbofan, twin-spool turbojet 1. A fan 2 at the front supplies the engine with air. The air compressed by the fan is divided into two concentric flows. The secondary flow is discharged directly into the atmosphere and provides an essential part of the motor thrust. The primary flow is guided through several compression stages to the combustion chamber where it is mixed with the fuel and burned. The hot gases supply the various turbine stages which drive the fan and the compression stages. The gases are then discharged into the atmosphere.

Such an engine comprises several stator vane ring impellers: an impeller downstream of the fan to synchronize the secondary flow before it is ejected, impellers between the movable impellers of the compressors and upstream guide vane elements between both the high-pressure and low-pressure turbine impellers.

According to the invention, there are vibration-damping laminates on the outer surface portions of at least a portion of the outer stator vanes rings or upstream guide vane elements.

Figure 2:
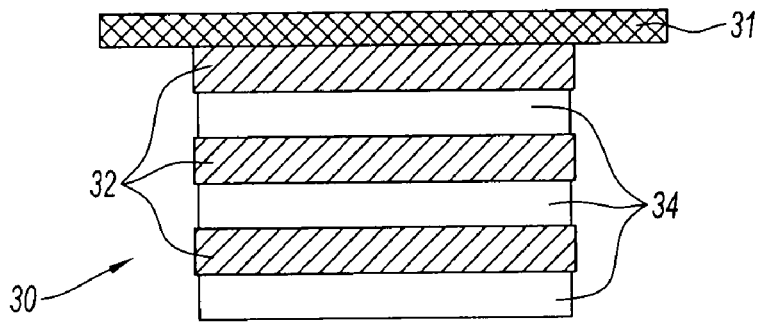
FIG. 2 represents in section a damping laminate according to the invention.

As is seen in FIG. 2, a laminate 30 is shown in the form of a plurality of layers stacked on one another. According to one embodiment, the laminate comprises a layer 32 of a viscoelastic material and a counterlayer 34 of a rigid material. The laminate is applied by the viscoelastic layer 32 to the surface 31 of a structure to be damped.

Viscoelasticity is a property of a solid or of a liquid which, when it is deformed, exhibits a behavior that is both viscous and elastic by simultaneous dissipation and storage of mechanical energy.

The isotropic or anisotropic characteristics of elasticity of the rigid material of the counterlayer 34 are superior to the isotropic or anisotropic characteristics of the viscoelastic material in the desired heat and frequency operating range. As a nonlimiting example, the material of the layer 34 may be of metallic or composite type, and the material of the layer 32 may be of the rubber, silicone, polymer, glass or epoxy resin type. The material must be effective in terms of energy dissipation in the expected configuration corresponding to determined temperature and frequency ranges. It is chosen on the basis of its characteristic shear moduli, expressed in deformation and speed.

According to other embodiments, the laminate comprises several layers 32 of viscoelastic material and several counterlayers 34 of rigid material that are placed alternately. The example of FIG. 2 shows in a nonlimiting manner a damping laminate having three layers 32 of viscoelastic material and three counterlayers 34 of rigid material. Depending on the applications, the layers 32 of viscoelastic material and the counterlayers 34 of rigid material have equal dimensions or different dimensions. When the laminate comprises several layers 32, the latter may have all the same mechanical characteristics or else have different mechanical characteristics. When the laminate comprises several counterlayers 34, the latter may have all the same mechanical characteristics or else have different mechanical characteristics. The layers 32 and the counterlayers 34 are attached to one another preferably by adhesion by means of a film of adhesive or by polymerization.

Figure 3:
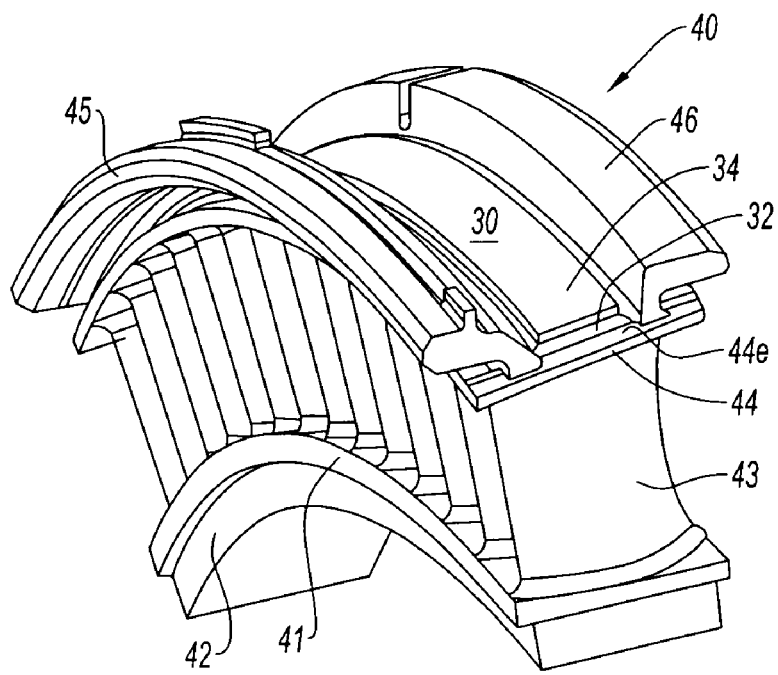
FIG. 3 represents a stator sector seen in perspective fitted with a damping laminate according to the invention.

FIG. 3 shows a first embodiment. The stator sector 40, in this instance a turbine upstream guide vane element sector, comprises a radially inner ring element 41 supporting a sealing element 42 on one side and forming the inner wall of the gas stream on the other side. A plurality of vanes 43 extend radially from the ring element 41 to the radially outer ring element 44. The element 44 forms on the one side the outer wall of the gas stream sweeping the vanes 43. The ring element 44 comprises upstream and downstream attachment members 45 and 46. The outer surface 44e of the element 44 is substantially cylindrical in shape. The laminate 30, consisting of two layers: 32 viscoelastic and 34 rigid counterlayer 34, is attached to this surface portion 44e. The laminate 30 is attached by bonding or polymerization of the viscoelastic layer to the surface portion 44e. This laminate extends over an axial portion of the surface portion 44e. Preferably, it extends circumferentially over the whole sector. When the sectors 40 are installed in the turbine casing, they form a complete upstream guide vane element impeller with the damping laminates over the whole circumference of the upstream guide vane element outer surface.

In operation, the vibration modes of the stator vane ring or upstream guide vane element sectors but also the vibration modes of the vanes are damped by the laminates without disrupting the aerodynamic flow in the gas stream.

Figure 4:
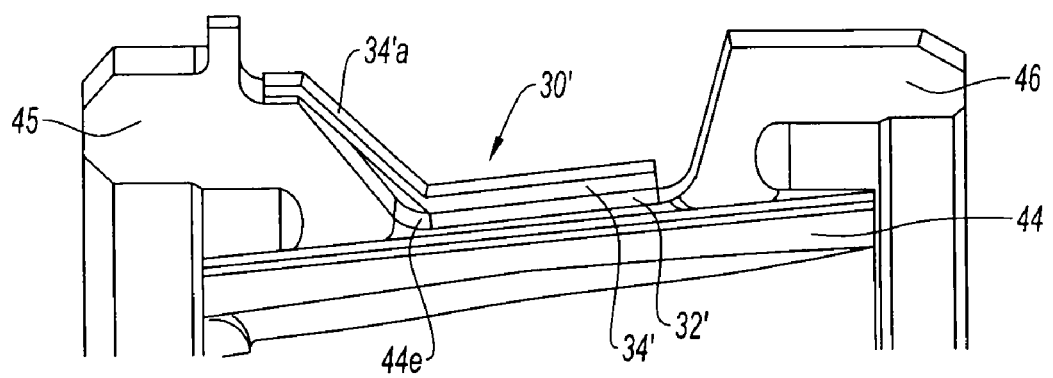
FIG. 4 shows another embodiment of the invention.

FIG. 4 shows a second embodiment. The stator vane ring or upstream guide vane element sector seen in axial section on the portion of the radially outer element 44 is the same as above with an inner ring element 41 and an outer ring element 44. The damping laminate 30' here also comprises a viscoelastic layer 32' and a rigid counterlayer 34'. The difference lies in the mode of connection with the stator vane ring respectively upstream guide vane element sector. The rigid counterlayer 34' comprises a lateral extension 34a' which presses on a more solid and thick portion of the outer ring element 44. In this example, it is the upstream attachment member 45. The lateral extension 34a' is bolted or attached by another means to the attachment member 45. This is how a better resistance of the damping laminate is ensured during the various events which the stator has to withstand. In this case, the laminate is not necessarily bonded to the outer surface of the ring portion 44. The mechanical attachment provides a pressure of the laminate against this surface so that, when the vibrations occur, the latter are transmitted to the viscoelastic layer. As in the preceding case, the solution of the application of a viscoelastic damping laminate on the outer ring of the stator may be adapted according to the circumstances.

The invention claimed is:

1. A turbomachine stator forming a stator vane ring or upstream guide vane element comprising:
   a first inner ring;
   a second outer ring concentric with said first inner ring, said second outer ring having a cylindrical outer surface portion, an upstream attachment portion, and a downstream attachment portion, said upstream and downstream attachment portions being radially higher than said outer surface portion; and
   a plurality of vanes placed radially between said first inner ring and said second outer ring,
   wherein, on said outer surface portion, at least one vibration-damping laminate is attached, the laminate comprising at least one layer of viscoelastic material in contact with said surface portion and one outermost counterlayer of rigid material, and wherein said outermost counterlayer of rigid material includes a lateral extension with a first end which abuts one of said upstream or downstream attachment portions and a second end concentric with said outer surface portion.

2. The stator as claimed in claim 1, wherein the laminate partially covers said outer surface portion.

3. The stator as claimed in claim 1, comprising a plurality of laminates distributed circumferentially over the outer surface portion.

4. The stator as claimed in claim 1, wherein the layers are connected together.

5. The stator as claimed in claim 4, wherein the layers are connected together by bonding.

6. The stator as claimed in claim 1, wherein said first end of said outermost counterlayer includes a mechanical attachment member.

7. The stator as claimed in claim 6, wherein the mechanical attachment member connects the outermost counterlayer to the stator.

8. The stator as claimed in claim 7, wherein the mechanical attachment member keeps the viscoelastic layer pressing against said outer surface portion.

9. A turbomachine comprising at least one stator as claimed in claim 1.

10. The stator as claimed in claim 1, wherein said outermost counterlayer is not bonded to said outer surface portion.

11. A turbomachine stator forming a stator vane ring or upstream guide vane element comprising:
a plurality of vanes placed radially between a first inner ring and a second outer ring, the two rings being concentric, the second ring having a cylindrical outer surface portion,
wherein, on said outer surface portion, at least one vibration-damping laminate is attached, the laminate comprising at least one layer of viscoelastic material in contact with said surface portion and one counterlayer of rigid material, and
wherein the laminate consists of a stack of viscoelastic layers and alternating rigid layers.

12. The stator as claimed in claim 11, wherein characteristics of the viscoelastic material vary from one layer to the other.

13. The stator as claimed in claim 11, wherein characteristics of the viscoelastic material are the same from one layer to the other.

14. The stator as claimed in one of claims 11 to 13, wherein characteristics of the rigid material vary from one rigid layer to the other.

15. The stator as claimed in claim 13, wherein characteristics of the rigid material are the same from one rigid layer to the other.

16. A turbomachine comprising at least one stator as claimed in claim 11.

* * * * *